US009454695B2

(12) United States Patent
Gallé

(10) Patent No.: US 9,454,695 B2
(45) Date of Patent: Sep. 27, 2016

(54) SYSTEM AND METHOD FOR MULTI-VIEW PATTERN MATCHING

(71) Applicant: Xerox Corporation, Norwalk, CT (US)

(72) Inventor: Matthias Gallé, Saint Martin d'Hères (FR)

(73) Assignee: XEROX CORPORATION, Norwalk, CT (US)

( * ) Notice: Subject to any disclaimer, the term of this patent is extended or adjusted under 35 U.S.C. 154(b) by 92 days.

(21) Appl. No.: 14/520,458

(22) Filed: Oct. 22, 2014

(65) Prior Publication Data

US 2016/0117550 A1    Apr. 28, 2016

(51) Int. Cl.
G06K 9/68 (2006.01)
G06K 9/00 (2006.01)
G06K 9/62 (2006.01)

(52) U.S. Cl.
CPC ....... G06K 9/00456 (2013.01); G06K 9/00469 (2013.01); G06K 9/00483 (2013.01); G06K 9/6203 (2013.01)

(58) Field of Classification Search
None
See application file for complete search history.

(56) References Cited

U.S. PATENT DOCUMENTS

| 5,304,786 | A * | 4/1994 | Pavlidis | G06F 3/002 235/456 |
| 5,687,253 | A * | 11/1997 | Huttenlocher | G06K 9/6206 382/177 |
| 7,054,803 | B2 * | 5/2006 | Eisele | G06F 17/2827 704/2 |
| 7,359,895 | B2 * | 4/2008 | Chang | G06F 17/30985 |
| 8,234,106 | B2 * | 7/2012 | Marcu | G06F 17/2735 704/10 |
| 2008/0027934 | A1 * | 1/2008 | Duxbury | G06F 17/30985 |
| 2008/0133474 | A1 * | 6/2008 | Hsiao | G06F 19/22 |
| 2009/0175545 | A1 | 7/2009 | Cancedda et al. | |
| 2009/0307218 | A1 * | 12/2009 | Selly | G06F 17/30445 |
| 2010/0195909 | A1 * | 8/2010 | Wasson | G06F 17/241 382/176 |
| 2013/0262465 | A1 * | 10/2013 | Galle | G06F 17/30707 707/737 |
| 2014/0058725 | A1 * | 2/2014 | Longe | G06F 3/0236 704/9 |
| 2014/0095834 | A1 * | 4/2014 | Kuo | G06F 9/30018 712/208 |
| 2014/0229160 | A1 | 8/2014 | Gallé | |
| 2014/0379726 | A1 * | 12/2014 | Roger | G06F 19/22 707/741 |
| 2015/0100304 | A1 * | 4/2015 | Tealdi | G06F 17/22 704/9 |
| 2015/0142853 | A1 * | 5/2015 | Tealdi | G06F 17/30958 707/798 |
| 2015/0370781 | A1 * | 12/2015 | Galle | G06F 17/2775 704/9 |

OTHER PUBLICATIONS

Hardware-Assisted Algorithm for Full-text Large-dictionary String Matching Using n-gram Hashing, 1998, Information Processing and Management, vol. 34, No. 4, pp. 443-464.*

(Continued)

Primary Examiner — Chan Park
Assistant Examiner — Iman K Kholdebarin
(74) Attorney, Agent, or Firm — Fay Sharpe LLP

(57) ABSTRACT

A method for matching a pattern to a multi-view sequence includes receiving a multi-view sequence which includes a plurality of sequences. Each sequence includes symbols drawn from a respective alphabet. A pattern to be matched on the multi-view sequence is received. The pattern includes a sequence of symbols drawn from a plurality of the alphabets. Offsets are assigned to the symbols as a function of a latest position of the symbol in the pattern or a length of the pattern otherwise. The multi-view sequence is traversed with the pattern to identify index positions in the sequence at which the pattern matches the corresponding part of the multi-view sequence. The pattern is shifted between index positions by a shift which is based on a minimum of the offsets for those of the symbols of the plurality of sequences that are aligned with a last of the symbols in the pattern.

19 Claims, 3 Drawing Sheets

(56) References Cited

OTHER PUBLICATIONS

Boyer, et al., "A fast string searching algorithm," Comm. ACM, 20(10) pp. 762-772 (1977).
Charras, et al., "Exact String matching algorithms," 17 pages, downloaded on Aug. 5, 2014, at http://www-igm.univ-mlv.fr/~lecroq/string/.
Erikson, Algorithms, Lecture 18: "More String Matching", pp. 1-8, downloaded on Aug. 5, 2014, at http://www.cs.uiuc.edu/class/fa06/cs473/lectures/18-kmp.pdf.
Horspool, "Practical fast searching in strings," Software—Practice and Experience, vol. 10, pp. 501-506 (1980).
Knuth, Jr., et al., "Fast pattern matching in strings," SIAM Journal on Computing, 6(2) pp. 323-350 (1977).
U.S. Appl. No. 14/311,993, filed Jun. 23, 2014, Matthias Gallé.
U.S. Appl. No. 13/901,736, filed May 24, 2013, Matthias Gallé.
U.S. Appl. No. 14/047,099, filed Oct. 7, 2013, Matthias Gallé, et al.

\* cited by examiner

SYSTEM AND METHOD FOR MULTI-VIEW PATTERN MATCHING

BACKGROUND

The exemplary embodiment relates to systems and methods for identifying matching subsequences in a sequence of symbols, and finds application in representing a textual document using identified matching subsequences, for searching and interpretation of documents, such as classifying the textual document, or for comparing or clustering of documents.

Pattern matching is widely used for searching for subsequences occurring in a sequence of symbols, such as a sequence of words in a text document. Given a sequence of symbols S, a naïve algorithm for pattern matching simply tries to match a pattern p at each position i of S. If, for example the pattern p=abc and the sequence S=abdabc, the first alignment would fail because S has a d in its third position, compared to a c for p. The pattern would then be shifted by one, and bda (substring starting at position 2 of S) would be compared to p. However, at this stage, it is already known that S does not contain an a (the first letter of the pattern) in the three first positions, so it is known that aligning p to either of the next two positions will fail.

There are several more advanced exact string matching algorithms for performing pattern matching. Among them are the Knuth-Morris-Pratt (KMP) algorithm (see, Knuth, Jr., et al., "Fast pattern matching in strings," SIAM Journal on Computing, 6(2) pp. 323-350 (1977)) and the Boyer-Moore algorithm (see, Boyer, et al., "A fast string searching algorithm," Comm. ACM, 20(10), pp. 762-772 (1977)). Both improve over a naive algorithm by taking advantage of the information of a mismatch, shifting over parts of S on which it can be certain that a match will not occur. In the KMP algorithm, a failure table is created by preprocessing the pattern. This table gives, for each position j of p, the position to look for a new match if the current one fails. So, when ababc is matched against abababc, the first alignment (at position 1 of S) will fail at position 5 of p (c≠a), but the failure table will indicate that the next alignment should start at position 3 of S, because it is observed that there is an ab starting at that position which coincides with the start of p.

As can be seen from the example, this algorithm takes advantage of repetitions inside p (in particular, repetitions of any prefix of p). In the case of the Boyer-Moore algorithm, this is made more explicit. The original version ("BM1") has two different tables, and a second version ("BM2") focuses precisely on handling repetitions of suffixes (because the Boyer-Moore compares from right to left). However, such repetitive patterns are unusual in practice, as observed by Horspool (see, Horspool, "Practical fast searching in strings," Software—Practice and Experience, vol. 10, pp. 501-506 (1980)). Horspool shows how a simplified version of the Boyer-Moore algorithm ("BMH," dropping the second rule, and further simplifying the first one) can sometimes provide results that are better than BM1 and BM2, because the algorithm shortens the pre-processing time. A comparison of different exact simple string pattern matching is provided in Frakes, et al. ("Information Retrieval: Data Structures and Algorithms," Prentice-Hall, Inc. (1992). Frakes compares different exact simple string pattern matching methods by plotting computation time vs. pattern length. The plot shows that the KMP algorithm is fairly independent of length while other methods, such as the BM1 and BM2 versions and the BMH perform worse at short pattern lengths but have increasingly lower computation times than the KMP as pattern length increases.

The above methods are useful in identifying sequences of characters, such as words, in a document. Pattern matching may also be used to identify other types of annotation. For example, a document may be annotated with parts-of-speech (POS), such as noun, verb, etc., or more discrete POS, such as singular noun (NN), plural noun (NNS), verb in past tense (VBD), etc. A search for a predefined sequence of POS in an annotated document may then be performed. For example, using a pattern represented by the POS sequence NN VB NNS, a search of a POS sequence could be performed. In some cases, matching a pattern that includes a mixture of annotation types could provide more useful information. For example, a user may be interested in retrieving all occurrences of Carlson invented NN. Or, a user may be interested in the retrieval of records from a collection of trivia annotated with POS and where each word is annotated as to whether it is a superlative (SUP) or not. As an example, the objective could be to retrieve occurrences of a pattern such as NNS is the SUP NNS of France, which could yield the specific instances: Mont Blanc, highest, mountain; Bettencourt, wealthiest, person; Saint-Cirq-Lapopie, prettiest, village; and so forth.

Each of the different types of annotation (including the words themselves or their root forms) can be considered as a view of the sequence. For a sequence of symbols S, there thus may be k different views over the sequence. A query such as those in the examples which involves more than one of the views involves what is referred to herein as multi-view pattern matching, because the pattern can contain any combination of the possible views. Current pattern matching methods, such as the KMP, BM1 and BM2 and BMH methods, do not address the issue of multiple views. This is particularly a problem for retrieving regular expressions, where the variety lies in the sequence, not in the pattern. Some studies of inexact (or fuzzy) pattern matching have been made, including cases when p includes wildcards (fixed or extensible), multi-character symbols and regular expressions. However, these approaches are not applicable to the case of exact pattern matching.

There remains a need for an efficient method for finding occurrences of a multi-view pattern in a multi-view sequence.

INCORPORATION BY REFERENCE

The following references, the disclosures of which are incorporated herein in their entireties by reference, are mentioned:

The following references relate to identification of repeated subsequences in text: U.S. Pub. No. 20140229160, published on Aug. 14, 2014, entitled BAG-OF-REPEATS REPRESENTATION OF DOCUMENTS, by Matthias Gallé; U.S. application Ser. No. 13/901,736, filed May 24, 2013, entitled IDENTIFYING REPEAT SUBSEQUENCES BY LEFT AND RIGHT CONTEXTS, by Matthias Gallé; U.S. application Ser. No. 14/047,099, filed Oct. 7, 2013, entitled INCREMENTAL COMPUTATION OF REPEATS, by Matthias Gallé and Matías Tealdi; and U.S. application Ser. No. 14/311,993, filed on Jun. 23, 2014, entitled EXTENDED-CONTEXT-DIVERSE REPEATS, by Matthias Gallé.

U.S. Pub. No. 20090175545, published Jul. 9, 2009, entitled METHOD FOR COMPUTING SIMILARITY BETWEEN TEXT SPANS USING FACTORED WORD SEQUENCE KERNELS, by Nicola Cancedda, et al., describes a method for computing a similarity measure between first and second sequences of symbols. Each of the symbols comprises at least one consecutive word and is defined according to a set of linguistic factors. Pairs of symbols in the first and second sequences that form a shared subsequence of symbols are each matched according to at least one of the factors.

BRIEF DESCRIPTION

In accordance with one aspect of the exemplary embodiment, a method for matching a pattern to a multi-view sequence includes receiving a multi-view sequence comprising a plurality of sequences. Each sequence includes symbols drawn from a respective alphabet. A pattern to be matched on the multi-view sequence is received. The pattern includes a sequence of symbols drawn from a plurality of the alphabets. Offsets are assigned to symbols in the pattern as a function of a latest position of the symbol in the pattern. The multi-view sequence is traversed with the pattern to generate alignments between the pattern and the plurality of sequences at a plurality of index positions of the plurality of sequences. This includes shifting the pattern relative to the multi-view sequence at least once, from a first alignment at a first of the index positions to a second alignment at a second of the index positions, by a shift which is based on a minimum of the offsets for those of the symbols of the plurality of sequences that are aligned with a last of the symbols in the pattern in the first of the alignments. Index positions are identified from the plurality of index positions at which the pattern matches the multi-view sequence by comparing the symbols of the pattern to the symbols of the plurality of sequences in the respective alignment.

At least one of the computing of the offsets, the traversing of the multi-view sequence, and the identifying of the index positions may be performed with a processor.

In accordance with another aspect of the exemplary embodiment, a system for matching a pattern to a multi-view sequence includes memory which stores instructions for: receiving a multi-view sequence comprising a plurality of sequences, each sequence consisting of symbols drawn from a respective alphabet; receiving a pattern to be matched on the multi-view sequence, the pattern consisting of a sequence of symbols drawn from a plurality of the alphabets; assigning offsets to symbols in the sequences comprising assigning an offset to a symbol that is a function of a latest position of the symbol in the pattern; traversing the multi-view sequence with the pattern to generate alignments between the pattern and the plurality of sequences at a plurality of index positions of the plurality of sequences, including shifting the pattern relative to the multi-view sequence at least once, from a first alignment at a first of the index positions to a second alignment at a second of the index positions, by a shift which is based on a minimum of the offsets for those of the symbols of the plurality of sequences that are aligned with a last of the symbols in the pattern in the first of the alignments; and identifying index positions from the plurality of index positions at which the pattern matches the multi-view sequence by comparing the symbols of the pattern to the symbols of the plurality of sequences in the respective alignment. A processor implements the instructions.

In accordance with another aspect of the exemplary embodiment, a method for matching a pattern to a multi-view sequence includes receiving a multi-view sequence which includes a plurality of sequences. Each sequence consists of a same number of symbols drawn from a respective alphabet. The alphabets are mutually exclusive. A pattern to be matched on the multi-view sequence is received. The pattern consists of a sequence of symbols drawn from at least two of the alphabets. An offset table is generated. This includes, for symbols appearing in the pattern, assigning an offset as a function of a latest position of the symbol in the pattern other than a last position and for all other symbols in the sequences, an offset which is a length of the pattern. The multi-view sequence is traversed with the pattern to generate alignments between the pattern and the plurality of sequences at a plurality of index positions of the plurality of sequences. This includes shifting the pattern at least once, from a first alignment at a first of the index positions to a second alignment at a second of the index positions, by a shift which is a minimum of the offsets in the offset table for those of the symbols of the plurality of sequences that are aligned with a last of the symbols in the pattern in the first of the alignments. Index positions are identified from the plurality of index positions at which the pattern matches the multi-view sequence by comparing the symbols of the pattern to the symbols of the plurality of sequences in the respective alignment.

At least one of the computing of the offsets, the traversing of the multi-view sequence, and the identifying of the index positions may be performed with a processor.

DETAILED DESCRIPTION

Figure 1:
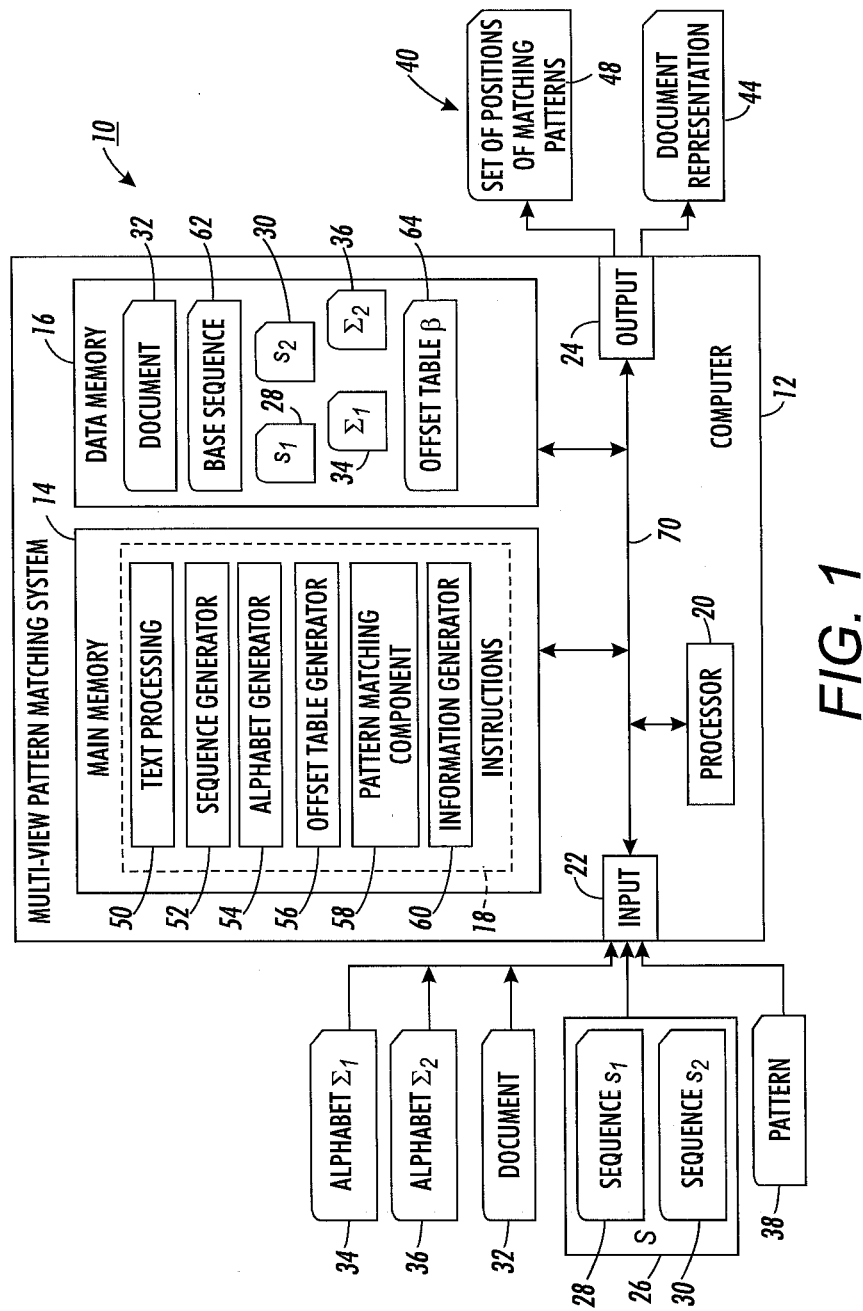
FIG. 1 is a functional block diagram of a system for multi-view pattern matching in accordance with one aspect of the exemplary embodiment.

The exemplary system and method provide for efficiently finding at least one or all occurrences of a multi-view subsequence (or "pattern") p in a multi-view sequence S of symbols by pre-processing the sequence S to identify an offset for each symbol in p.

Let S represent a set of k sequences, $S=[s_1, \ldots, s_k]$, all of the same size (length) n symbols (characters) over a set of mutually exclusive (pair-wise disjoint) alphabets $[\Sigma_1, \ldots, \Sigma_k]$, each alphabet including a set of one, two, or more symbols, such that each symbol in sequence $s_i$ is drawn from its respective alphabet ($s_i \epsilon \Sigma_i^*$); no two alphabets intersect with each other ($\Sigma_i \cap \Sigma_j = \emptyset$), and no two characters are the same ($\forall i \neq j$). Let $t(c)$ denote the type of character c: $t(c)=k$ if and only if $c \epsilon \Sigma_k$. The number k of different views is at least two, such as from 2 to 20 or from 2 to 5. Each sequence $s_i$ consists of n symbols, where n is at least 3, such as at least 20 or at least 40.

A pattern $p \epsilon (\cup_{i=1}^k \Sigma_i)^*$ which includes symbols drawn from one or more of the k alphabets (generally, at least one symbol is drawn from each of at least two of the alphabets) is said to occur at position i of the sequence S if $p[j]=s_{t(p[j])}[i+j], \forall 1 \leq j \leq |p|$, i.e., the symbol at each position j in the pattern matches the symbol of that type occurring at the respective position in the sequence following position i. The symbol * indicates that concatenations of symbols are contemplated. The pattern p consists of m symbols, where m is at least 2, such as at least 3 or at least 4. n>m, e.g., n≥2m or n≥10m.

The pattern matching problem to be solved is to find all occurrences of p in S. The pattern includes a single symbol at each of its positions which can be drawn from any of the alphabets. In a multi-view pattern, one or more of the symbols in the pattern is/are drawn from a first of the alphabets and one or more of the symbols in the pattern is/are drawn from a second of the alphabets. A multi-view subsequence p thus represents a continuous sequence of two or more symbols that are drawn from two or more of the alphabets $\Sigma_i^*$, although it is to be appreciated that the algorithm can also be applied to cases where all the symbols in p are from the same alphabet.

For example, given a text sequence, such as a sentence, paragraph, or longer sequence (which may have been stripped of all punctuation), in which the symbols are associated with words, a first of the views could be the words (either their surface forms or root (lemma) forms) and the first alphabet $\Sigma_1$ could be the set of all such words occurring in the text sequence or a larger set of words. A second of the views could be parts-of-speech (POS) and the second alphabet $\Sigma_2$ could be a predefined set of POS with which the text sequence is annotated. A third of the views could represent a decision as to whether the word corresponds to a selected morphological tag, e.g., for one or more of number, gender, case, mood, transitivity, tense, or to semantic information as encoded in semantic networks such as WordNet. For example, a third view may be a binary decision, such as whether the word is a superlative and the third alphabet $\Sigma_3$ could be {0,1} with 0 representing "not a superlative" and 1 representing "a superlative," each of the words of the text sequence being annotated with one of these two symbols. As will be appreciated, these are only exemplary and any combination of these or other views is contemplated.

In this example, each of the plurality of sequences $s_1, \ldots, s_k$ thus corresponds to annotations of the same standard sequence (e.g., a sequence of words from a text document, which can be one of the considered sequences $s_1, \ldots, s_k$), such that for each position in the standard sequence, the corresponding positions in the two or more sequences $s_1, \ldots, s_k$ are the respective annotations in the corresponding alphabets. As used herein, "a plurality" means at least two.

As an example, consider the sentence "Carlson invented the photocopier." Each word is assigned a position in the sequence. Corresponding symbols in two other sequences $s_2$ (lemma form) and $s_3$ (POS) are indexed by the same positions. The values of the sequences $s_2$ and $s_3$ may be derived from the standard sequence $S_1$.

| position | 1 | 2 | 3 | 4 |
|---|---|---|---|---|
| $s_1$ (standard view) | Carlson | invented | the | photocopier |
| $s_2$ (lemma) | Carlson | invent | the | photocopier |
| $s_3$ (POS) | NP | VBD | Art | NN |

As will be appreciated, the unique symbols used to identify lemma forms, POS, etc. can be numbers, letters, other ASCII characters, or any combination thereof. In one embodiment, the standard sequence is one of the set of k sequences of S. In other embodiments, it is not. The method is not limited to sequences based on text. For example, biochemical sequences, such as amino acid sequences, sequences of actions, and the like, are also contemplated.

An algorithm for multi-view pattern matching can be based on an existing pattern matching algorithm. In the following, the Horspool adaptation of the Boyer-Moore algorithm (BMH) is extended to the multi-view case. The BMH was selected since it already shows good performance on benchmarks (see Frakes) and also because the improvement of other algorithms with respect to it lie in the fact that they avoid comparisons due to repetitions inside the pattern. However in the case of multi-view patterns, this is not straightforward, as the following example shows.

Example 1

| position | 1 | 2 | 3 | 4 | 5 | 6 | ... |
|---|---|---|---|---|---|---|---|
| p = AaAab and S = $s_1$ | b | a | a | a | a | b | ... |
| $s_2$ | A | A | A | A | B | B | ... |

Aligning p at position 1 fails due to the last character. However, if the algorithm takes advantage of the repetition of Aa and shifts p directly to position 3, this would lose the match that occurs at position 2. The fact that symbols from one alphabet may mask symbols from another makes such an approach much more cumbersome. They act as a kind of wildcard in the pre-processing (but not during the matching), and existing extensions of pattern matching to such cases are very sensitive to the number of such wildcards (in the present case, any character acts as wildcard for the other alphabet(s)).

A pre-processing step includes filling an offset table β. The table gives, for each symbol in the pattern p, the offset (expressed as the number of positions) from the last position of the pattern to its latest occurrence, preceding the last position. Thus, each character is assigned a value in the table β according to Eq. (1):

$$\beta(c)=\min\{i|i=m \vee (1\leq i<m \wedge p[m-i]=c)\} \qquad (1)$$

i.e., the value in the offset table for each symbol of each type c is m (length of the pattern p) if c does not appear in the pattern p, otherwise, it is the offset from the end of its latest occurrence in the pattern. The offset is formalized by asking for p[m−c], and the *latest* is formalized by asking for the minimal value (the minimal value of the offset is the maximal position, i.e., the latest). By requiring i to start from 1 this enforces a rule that for the symbol in the last position of the pattern, the method looks for the second-to-last position.

For Example 1, where the pattern is AaAab this table would be β(a)=1, β(A)=2, β(b)=5, β(B)=5. For example, the latest occurrence of A is at position 3 which is offset by 2 positions from the last position in the pattern, 5, so its offset is 2. For the characters occurring in the last position of a respective sequence, the table gives the offset to the second-to-last occurrence. If the character does not occur in the pattern, its offset is the number of characters in the pattern (m=|p|). Thus, the offsets for b and B are both 5. An algorithm for multi-view pattern matching is shown below. For each alignment, the algorithm first compares the last character in the pattern and, if it matches, the algorithm continues comparing the remaining ones. One difference from existing algorithms is in the shift, where the Algorithm considers the lowest value of all the offsets of symbols occurring at the current position, taken over all sequences $s_k$.

As will be appreciated, a similar result could be achieved by storing a table β based on the left offset, rather than the right and comparing from left to right in the matching step, rather than right to left.

| Algorithm 1 |
| --- |
| Multi-view-Horspool(S,p,t) |
| Input: sequence S = [$s_1,...,s_k$], pattern p, and implicit type function t |
| Output: all matches of p in S |
| 1: pre-process p to produce β in accordance with Eq. (1) |
| 2: j := 0 |
| 3: n,m := \|S\|,\|p\| |
| 4: while j ≤ n − m do |
| 5:    c := $S_{t(p[m])}$[j + m] |
| 6:    if p[m] = c ∧ p[1:m − 1] matches S[j:j + m − 1]    then |
| 7:        output j |
| 8:    end if |
| 9:    j:= j + $\min_k \beta(S_k[j + m])$ |
| 10: end while |

Specifically, the algorithm takes as input a multi-view sequence S, a (multi-view) pattern p, and a type function t which assigns each of the views a type. The purpose of the algorithm is to find all matches of the pattern in the sequence. The algorithm generates an offset table β (step 1) to be used throughout the traversal of the multi-view sequence S. The pattern position j is first set to 0 (j being the index position in the sequence preceding the first character of the pattern). This aligns the pattern p with the first m characters of the multi-view sequence S (step 2). n is set to the length of the sequence S and m to the length of the pattern p. While j is less than or equal to n−m, i.e., the last possible alignment of the pattern with the sequence, the following steps are performed. c is set to the alphabet type to which the pattern symbol aligned with position j+m belongs (step 5). If the last symbol in the pattern matches the aligned symbol in the sequence of this type, then the remaining symbols of the pattern are compared in a similar manner. If the pattern matches the type and symbol of the sequence at each position of the pattern in the current alignment (step 6), the value of j corresponding to that alignment is stored as a matching index position (step 7). A shift to the next alignment position involves looking up the table to identify the minimum offset $\min_k \beta(S_k[j+m])$ for the set of symbols in the sequence at position j+m (those aligned with the last symbol of the pattern) and computing a new value of j corresponding to the previous value of j plus the offset (step 9). The pattern is effectively shifted a number of symbols (to the right) by this minimum offset to the next alignment position, and the process is repeated until the pattern is not able to be shifted further (step 10). The matching index positions are output.

As an example, consider the execution of Algorithm 1 on the following example:

Example 2

| | | position | 1 | 2 | 3 | 4 | 5 | 6 | 7 | 8 |
|---|---|---|---|---|---|---|---|---|---|---|
| p = BAbB; | and S = | $s_1$ | c | a | b | b | a | a | b | c |
| | | $s_2$ | B | A | B | A | B | A | C | B |

In this example, the length n of the sequence S is 8, the length m of the pattern is 4 and the number k of views is 2.

The table β is first constructed. Based on the pattern: β(B)=3, β(A)=2, β(b)=1 and β=m=4 for all other symbols (step 1 of the algorithm).

Then, sequence S is traversed with the pattern p, using the offset to determine the shift for each candidate alignment. If a match is found at the current alignment position, the position is stored. In the first alignment, at position j=0, the last character B of the pattern does not match, as shown in bold:

| position | 1 | 2 | 3 | 4 | 5 | 6 | 7 | 8 |
|---|---|---|---|---|---|---|---|---|
| $s_1$ | c | a | b | b | a | a | b | c |
| $s_2$ | B | A | B | A | B | A | C | B |
| pattern | B | A | b | B | | | | |

For the shift, the Algorithm identifies the lowest β value of the symbols occurring in the position matching the last character of the pattern, which is currently position 4. The lowest value from β(b) and β(A) is 1. The second (next) alignment is created using a shift of 1:

| position | 1 | 2 | 3 | 4 | 5 | 6 | 7 | 8 |
|---|---|---|---|---|---|---|---|---|
| $s_1$ | c | a | b | b | a | a | b | c |
| $s_2$ | B | A | B | A | [B] | A | C | B |
| pattern | | B | A | b | [B] | | | |

The last character of the pattern matches, but not the remaining ones. In one embodiment, the algorithm compares the other symbols from the beginning to the end of the pattern, although any order could be used. p is then shifted according to min(β($s_1$[5]), $s_2$[5]), which is 3 (as β(a)=m=4 since a does not occur in the pattern). This finally results in a match, as indicated by the boxes:

| position | 1 | 2 | 3 | 4 | 5 | 6 | 7 | 8 |
|---|---|---|---|---|---|---|---|---|
| $s_1$ | c | a | b | b | a | a | [b] | c |
| $s_2$ | B | A | B | A | [B] | [A] | C | [B] |
| pattern | | | | | [B] | [A] | [b] | [B] |

FIG. 1 illustrates a computer-implemented system for multi-view pattern matching for example, incorporating Algorithm 1, described above. The system 10 includes a computer 12 with non-transitory main memory 14 and data memory 16. The memory 14 stores instructions 18 for performing the exemplary method described in FIG. 4. A digital processor 20, in addition to controlling operation of the computer 12, executes the instructions 18 stored in memory 14.

The illustrated computer 12 includes one or more input/output interfaces 22, 24 for communicating with external devices. Input interface 22, for example, may receive a set S 26 of two or more sequences 28, 30, etc. of symbols, each of which correspond to annotations of the same sequence of words in the document. In one embodiment, the sequences 28, 30 may be generated from one or more text documents 32, such as one or books, journal articles, newspaper articles, webpages, OCRed forms, combinations thereof, or the like. The sequence(s) 28, 30, e.g., two or more sequences per document (each sequence corresponding to a respective view of the same document), may be extracted externally or by the system 10. For example, for identifying parts-of-speech, a POS tagger configured to assign a POS tag to each word of the document from a predefined set of POS tags may be used. For tagging country or person names, a tagger which accesses a predefined list of countries/names may be used. Two or more sequences of the same type may be concatenated to form a single sequence of that type for a document collection. The symbols of a given view can be words (optionally lemmatized), characters, parts of speech (POS), semantic meaning, or the like, as discussed above. The input document 32 or sequences 28, 30 generated therefrom may be accompanied by a respective predefined alphabet 34, 36, one for each of the views, or the alphabets may be constructed as the document(s) 32 is/are processed, and may be stored in memory 16.

The system also receives a multi-view pattern 38 to be matched, which includes a sequence of symbols encompassing at least two of the views.

Output interface 24 outputs information 40, based on the application of the instructions 18. The information output may include a set 42 of matching positions matching the pattern, e.g., indexed by j or the first symbol position, generated by the system. In other embodiments, the information 40 includes a representation 44 of the document 32, which is based on the identified pattern matches. Other information 40 may be output based on the identified pattern matches. For example, a label may be output for a given document that is applied by a trained classifier based on the identified pattern matches in the document. In other embodiments, a cluster of documents is output or a set of documents similar to a selected document, or the like.

In one embodiment, the software instructions 18 may include a text preprocessing component 50, a sequence generator 52, an alphabet generator 54, an offset table generator 56, a pattern matching component 58, and an information generator 60. Briefly, the text preprocessing component 50 preprocesses an input text document 32 to form a base (standard) sequence 62. The text preprocessing component 50 may parse the input document(s) 32 by employing a grammar or other processing technique. For example, the preprocessor 50 may identify words in the input document(s), optionally remove stop words, and reduce all the remaining words to a normalized form, such as a lemmatized, lowercase form, which may serve as the base sequence and/or one of the sequences of symbols. In this process, plural nouns are replaced by the singular form and verbs may be replaced by the infinitive form of the verb. Punctuation may be stripped from the sequence. In some embodiments, words may be processed to identify their part of speech, by part-of-speech (POS) tagging, and the POS tags may serve as one of the sequences of symbols.

Optionally, the text preprocessing component 50 may combine (by e.g., concatenation) sequences from two or more documents 32 in a collection to create a larger base sequence 62.

The sequence generator 52 identifies a respective sequence 28, 30 of symbols in each alphabet 34, 36, etc., based on the input and optionally preprocessed text document(s) 32. Where a preexisting alphabet is not employed for a given view, the alphabet generator 54 generates and stores a respective alphabet 34, 36, e.g., as the document in being processed by the text preprocessing component 50 or during or after the respective sequence is/has been composed by the sequence generator 52. Components 50, 52, 54 can be omitted if the sequences and alphabets are generated elsewhere.

The offset table generator 56 generates an offset table 64 which includes, for each symbol in each of the generated sequences 28, 30, a respective assigned offset β, as described above, based on the pattern 38. As will be appreciated, the offset table 64 can be any suitable type of data structure in which the offsets are stored.

The pattern matching component 58 identifies instances of the pattern (pattern matches) in the set 26 of sequences, using the offset table to compute a shift to a new position in the sequence S from a current position of the pattern, as discussed above for Algorithm 1. At each new position, the pattern 38 is compared with the symbols of the sequences to determine if there is a match. The information generator 60 generates and outputs information 40, based on the pattern matches identified by the pattern matching component 58.

Data memory 16 stores the input document 32, sequences 28, 30 and alphabets 34, 36. Data memory also stores the offset table 62 after it is created by the generator 56 Data memory also stores various local variables used by the various modules which are omitted for clarity.

The computer 12 may include one or more dedicated and/or general purpose computing devices, such a server computer or a desktop or laptop computer with an associated display device and a user input device, such as a keyboard and/or cursor control device (not shown), or any suitable computing device capable of implementing the method. The memories 14, 16 may be separate or combined and may represent any type of computer readable memory such as random access memory (RAM), read only memory (ROM), magnetic disk or tape, optical flash, flash memory, or holographic memory. In one embodiment, the memory 14, 16 comprises a combination of random access memory and read only memory, which in the exemplary embodiment are non-transitory devices. The digital processor 20 can be variously embodied, such as by a single-core processor, a dual-core processor (or more generally by a multiple-core-processor), a digital processor and cooperating math coprocessor, a digital controller, and the like.

Exemplary input and output interfaces 22, 24 include wired and wireless network interfaces, such as modems, or local interfaces, such as USB ports, disk drives, and the like. Hardware components 12, 14, 16, 22, and 24 of the computer are communicatively interconnected by a data/control bus 70.

The term "software" as used herein is intended to encompass any collection or set of instructions executable by a computer or other digital system so as to configure the computer or other digital system to perform the task that is the intent of the software. The term "software" as used herein is intended to encompass such instructions stored in the storage medium such as RAM, a hard disk, optical disk, or so forth, as is also intend to encompass so-called "firmware" that is software stored on a ROM or so forth. Such software may be organized in various ways, and may include software components organized as libraries, Internet-based programs stored on a remote server or so forth, source code, interpretive code, directly executable code, and so forth. It is contemplated that the software may invoke system-level code or calls to other software residing on a server or other location to perform certain functions.

Figure 2:
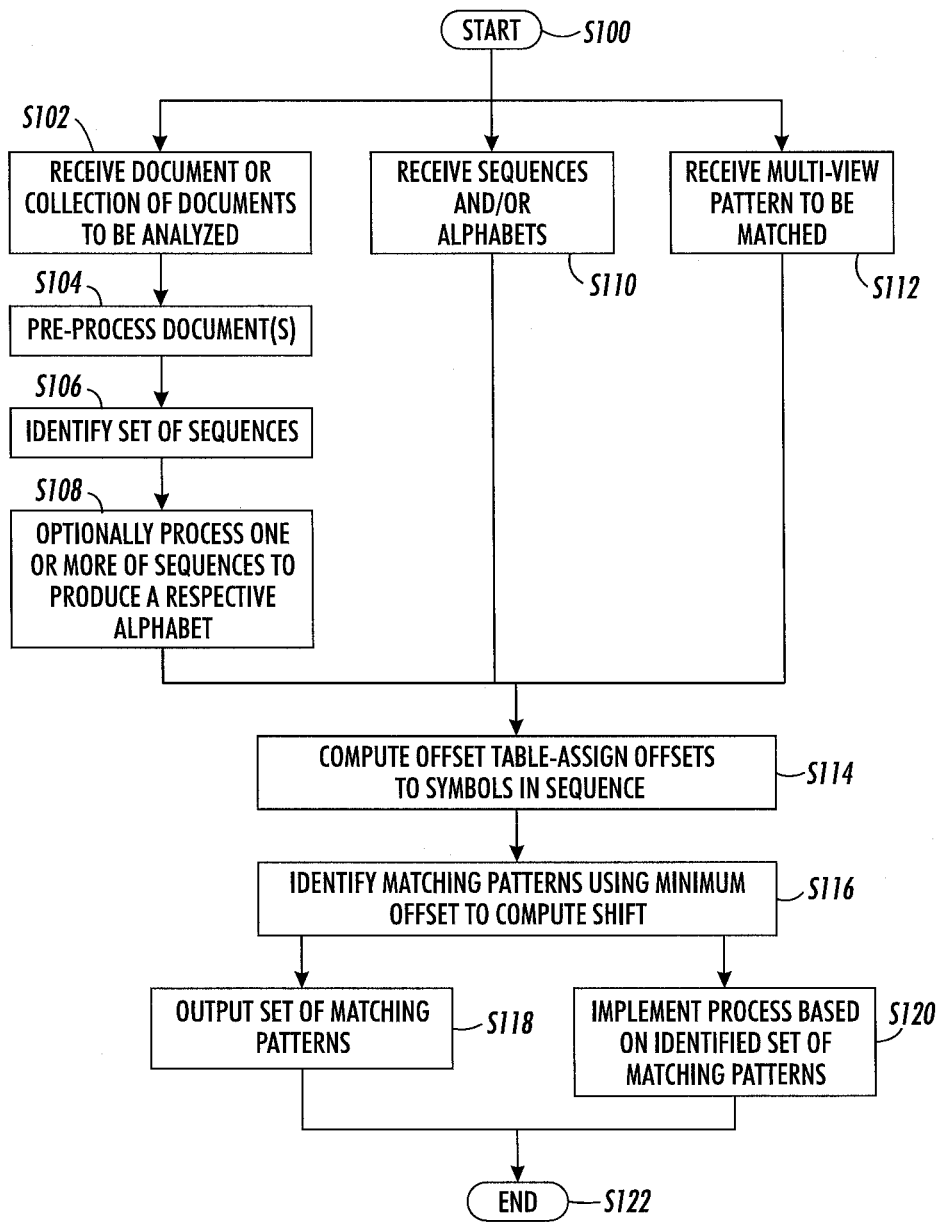
FIG. 2 is a flow diagram illustrating a method for multi-view pattern matching in accordance with another aspect of the exemplary embodiment.

FIG. 2 illustrates a computer-implemented method for multi-view pattern matching which may be performed with the system of FIG. 1. The method begins at S100.

At S102, a document 32 or collection of two or more documents 32 is received by the system 10 and may be stored in memory 16.

At S104, the document(s) 32 may be preprocessed by the text preprocessor 50 to produce a base sequence 62. This may include OCR processing the document, if not in text format, lemmatizing words and/or identifying parts of speech, and inserting a special character § to delineate the end(s) of each document.

At S106, one or more (additional or alternate) sequences are generated by the sequence generator 52 to provide a plurality of sequences 28, 30, etc.

At S108, one or more of the sequences 28, 30 may be processed by the alphabet generator 54 to produce a respective alphabet $\Sigma_1$, $\Sigma_2$, etc. 34, 36. The alphabet may consist of all symbols occurring in the respective sequence or additionally include symbols not present in the sequence. The special characters $\S_1$, $\S_2$, etc. used to identify the ends of sequences are not members of alphabets $\Sigma_1$, $\Sigma_2$, etc. 34, 36. In another embodiment, the sequences 28, 30 and/or alphabets are received or have been previously defined.

At S112, a multi-view pattern 38 to be matched is received.

At S114, an offset table 64 is computed by the offset table generator 56, based on the input pattern 38 (line 1 of Algorithm 1). In particular, an offset is assigned to each symbol of the sequences 28, 30 based on Eqn. (1).

At S116, the sequence set 26 is processed to produce a set of matching instances of the pattern by the pattern matching component 58, as explained above with reference to lines 2 to 10 of Algorithm 1. In particular, the multi-view sequence is traversed with the pattern (starting at one end of the sequence and progressing towards the other end) to generate alignments between the pattern and the plurality of sequences at a plurality of index positions of the multi-view sequence. This includes shifting the pattern relative to the multi-view sequence at least once, from a first alignment at a first index position to a second alignment at a second index position that is spaced from the first index position by at least one symbol. The shift is based on a minimum of the offsets for those of the symbols of the plurality of sequences that are aligned with a last symbol in the pattern in the first alignment. This creates shifts which are greater than 1 for those symbols in the pattern which are spaced from the end of the pattern by more than 1 position and limits the maximum shift to the length of the pattern where none of the symbols in the sequences aligned with the last symbol of the pattern do not appear in the pattern or which appear only in the last position. As will be appreciated, for some documents/patterns, the set of matching patterns may be empty.

At S118, index positions 42 of the subsequences of the multi-view sequence matching the pattern that were identified at S114 may be output.

At S120, a process may be implemented based on the identified matching patterns for one or more of the documents and information 40 based on the process may be output.

The method ends at S122.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 12, (for example, an internal hard drive of RAM), or may be separate (for example, an external hard drive operatively connected with the computer), or may be separate and accessed via a digital data network such as a local area network (LAN) or the Internet (for example, as a redundant array of inexpensive of independent disks (RAID) or other network server storage that is indirectly accessed by the computer, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually.

Without intending to limit the scope of the exemplary embodiment, the following evaluation illustrates the efficiency of the method.

Performance Evaluation

Figure 3:
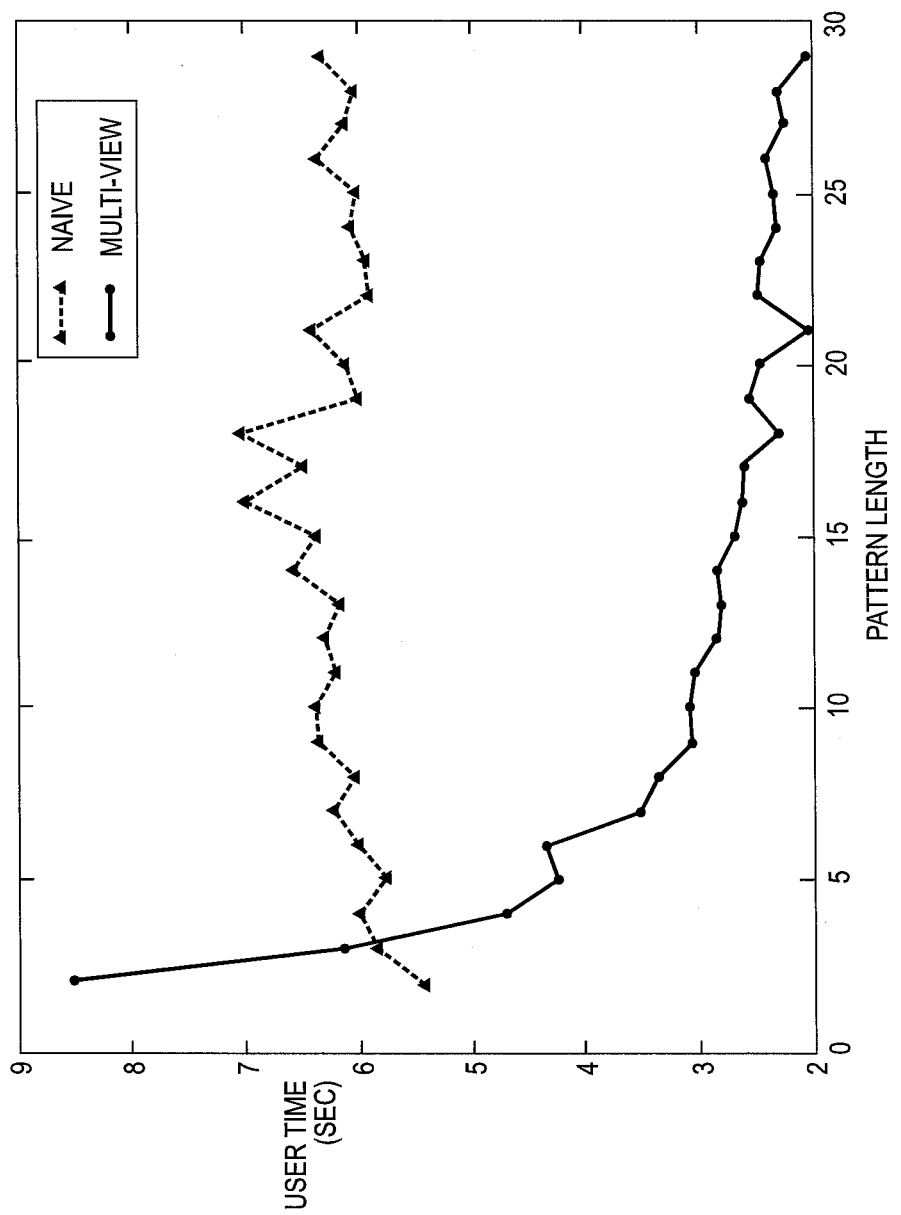
FIG. 3 shows total user time for 10000 instances of multi-view pattern matching compared with a naïve method.

Because Algorithm 1 has to compare the $\beta$ values at the current position of all k sequences, it is not obvious that this should be faster than a naive algorithm, which is independent of k. An evaluation was therefore performed by comparing the performance over randomly generated text, using the following setting: k=3, n=100000, $|\Sigma_i|$=10 and varying m from 2 to 30. Algorithm 1 ("multi-view") and the naïve algorithm were implemented in C, and computing time measured over 10000 generated examples (same sequences for each algorithm, generated uniformly and independent and identically distributed (i.i.d.)). The results are illustrated in FIG. 3.

While the performance improvement is not as great as the BMH method achieves in single-view pattern matching (not shown), when compared to the standard case, the multi-view method is still a factor of 2-3 times faster than the naive algorithm, particularly for longer patterns.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for matching a pattern to a multi-view sequence comprising:

receiving a multi-view sequence comprising a plurality of sequences, each sequence comprising symbols drawn from a respective alphabet;

receiving a pattern to be matched on the multi-view sequence, the pattern comprising a sequence of symbols drawn from a plurality of the alphabets;

assigning offsets to symbols in the pattern as a function of a latest position of the symbol in the pattern;

traversing the multi-view sequence with the pattern to generate alignments between the pattern and the plurality of sequences at a plurality of index positions of the plurality of sequences, including shifting the pattern relative to the multi-view sequence at least once, from a first alignment at a first of the index positions to a second alignment at a second of the index positions, by a shift which is based on a minimum of the offsets for those of the symbols of the plurality of sequences that are aligned with a last of the symbols in the pattern in the first of the alignments; and identifying index positions from the plurality of index positions at which the pattern matches the multi-view sequence by comparing the symbols of the pattern to the symbols of the plurality of sequences in the respective alignment, wherein at least one of the computing of the offsets, the traversing of the multi-view sequence, and the identifying of the index positions is performed with a processor.

2. The method of claim 1, wherein for a symbol which occurs in a last position of the pattern, the offset for that symbol is computed to a latest occurrence of that symbol before the last position.

3. The method of claim 1, wherein for each of the symbols of the plurality of sequences which are not in the pattern, a respective offset is based on a length of the pattern.

4. The method of claim 1, wherein for each of the symbols of the plurality of sequences, an offset β for a symbol in class c is computed according to Eq. (1):

$$\beta(c) = \min\{i | i = m \lor (1 \le i < m \land p[m-i] = c)\} \quad (1)$$

where m represents a length of the pattern p; and
i represents a number of symbols from a last position in the pattern to the symbol.

5. The method of claim 4, where the shift moves the pattern such that the first symbol in the pattern is at a position $j':=j+\min_k \beta(S_k[j+m])$ of the multi-view sequence $S_k$, where j represents a previous position of the first symbol in the pattern and each k represents one of the sequences in the multi-view sequence.

6. The method of claim 1, wherein the identifying index positions from the plurality of index positions at which the pattern matches the multi-view sequence comprises comparing each of the pattern symbols to each of the sequence symbols with which that pattern symbol is aligned, a match being found where one of the aligned sequence symbols matches the pattern symbol for each of the pattern symbols.

7. The method of claim 1, wherein the plurality of the sequences is derived from a text document.

8. The method of claim 7, wherein one of the plurality of sequences comprises a sequence of words and the respective alphabet comprises a set of words.

9. The method of claim 7, wherein one of the plurality of sequences comprises a sequence of parts of speech and the respective alphabet comprises a set of parts of speech.

10. The method of claim 7, wherein one of the plurality of sequences comprises a sequence of lemma forms of words in the text document and the respective alphabet comprises a set of lemma forms of words.

11. The method of claim 7, wherein at least one of the sequences comprises semantic labels of words in the text document words and the respective alphabet comprises a set of at least two semantic labels.

12. The method of claim 1, further comprising outputting information based on the identified index positions at which the pattern matches the multi-view sequence.

13. The method of claim 1, further comprising implementing a process based on the identified index positions at which the pattern matches the multi-view sequence.

14. The method of claim 1, wherein in a first of the alignments, the m symbols of the pattern are aligned with the first m symbols of the sequence.

15. The method of claim 1, wherein each of the sequences includes a same number n of symbols.

16. A computer program product comprising a non-transitory recording medium storing instructions which, when executed by a computer, perform the method of claim 1.

17. The method of claim 1, wherein the alphabets are mutually exclusive.

18. A system for matching a pattern to a multi-view sequence comprising:
memory which stores instructions for:
receiving a multi-view sequence comprising a plurality of sequences, each sequence comprising symbols drawn from a respective alphabet;
receiving a pattern to be matched on the multi-view sequence, the pattern comprising a sequence of symbols drawn from a plurality of the alphabets;
assigning offsets to symbols in the sequences comprising assigning an offset to a symbol that is a function of a latest position of the symbol in the pattern;
traversing the multi-view sequence with the pattern to generate alignments between the pattern and the plurality of sequences at a plurality of index positions of the plurality of sequences, including shifting the pattern relative to the multi-view sequence at least once, from a first alignment at a first of the index positions to a second alignment at a second of the index positions, by a shift which is based on a minimum of the offsets for those of the symbols of the plurality of sequences that are aligned with a last of the symbols in the pattern in the first of the alignments; and
identifying index positions from the plurality of index positions at which the pattern matches the multi-view sequence by comparing the symbols of the pattern to the symbols of the plurality of sequences in the respective alignment; and
a processor which implements the instructions.

19. A method for matching a pattern to a multi-view sequence comprising:
receiving a multi-view sequence comprising a plurality of sequences, each sequence consisting of a same number of symbols, the symbols in each sequence being drawn from a respective alphabet, the alphabets being mutually exclusive;
receiving a pattern to be matched on the multi-view sequence, the pattern consisting of a sequence of symbols, the symbols in the pattern being drawn from at least two of the alphabets;
generating an offset table including, for symbols appearing in the pattern assigning an offset as a function of a latest position of the symbol in the pattern other than a last position and for all other symbols in the sequences, an offset which is a length of the pattern;
traversing the multi-view sequence with the pattern to generate alignments between the pattern and the plurality of sequences at a plurality of index positions of the plurality of sequences, including shifting the pattern relative to the multi-view sequence at least once, from a first alignment at a first of the index positions to a second alignment at a second of the index positions, by a shift which is a minimum of the offsets in the offset table for those of the symbols of the plurality of sequences that are aligned with a last of the symbols in the pattern in the first of the alignments; and identifying index positions from the plurality of index positions at which the pattern matches the multi-view sequence by comparing the symbols of the pattern to the symbols of the plurality of sequences in the respective alignment, wherein at least one of the computing of the offsets, the traversing of the multi-view sequence, and the identifying of the index positions is performed with a processor.

\* \* \* \* \*